Sept. 29, 1925.
R. FRANCHOT
1,555,783
MEANS FOR WITHDRAWING GASES FROM BLAST FURNACES
Filed July 21, 1923
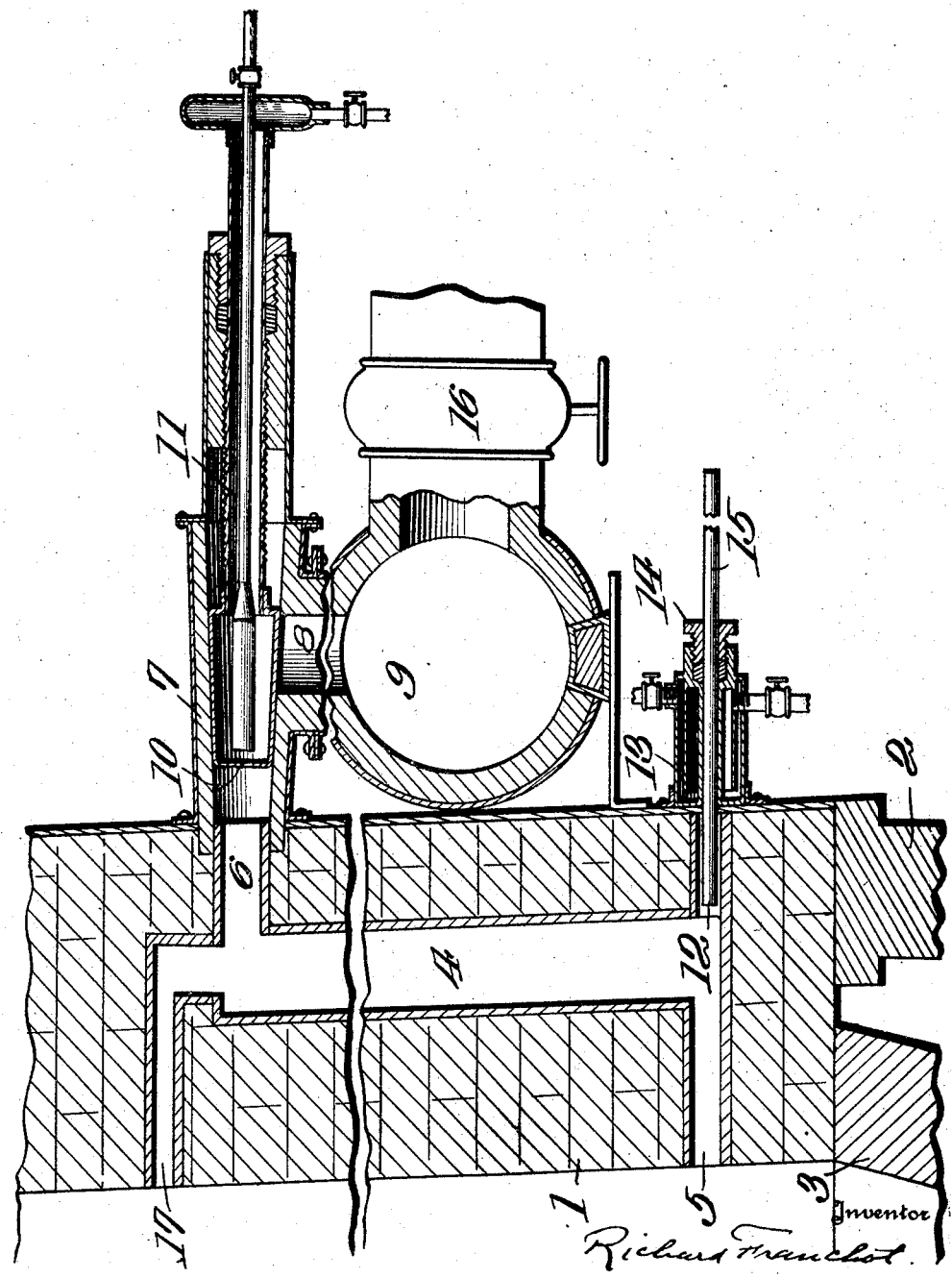
Inventor
Richard Franchot.
By O. P. McElroy
his Attorney Patented Sept. 29, 1925.

1,555,783

UNITED STATES PATENT OFFICE.

RICHARD FRANCHOT, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

MEANS FOR WITHDRAWING GASES FROM BLAST FURNACES.

Application filed July 21, 1923. Serial No. 652,937.

*To all whom it may concern:*

Be it known that I, RICHARD FRANCHOT, a citizen of the United States, residing at Washington, in the District of Columbia, have invented certain new and useful Improvements in Means for Withdrawing Gases from Blast Furnaces, of which the following is a specification.

This invention relates to means for withdrawing gases from blast furnaces and it includes a furnace having outlet means for gas and salines from the hot zone of the furnace, said means comprising one or more vertically disposed flues adjacent to the furnace wall, each flue leading near its lower end from the interior of the furnace and delivering near its upper end into a gas conduit, each flue also being provided with valve means controlling the flow of gas through said flue; all as more fully hereinafter set forth and as claimed.

In the operation of blast furnaces or slagging gas producers it has been found that improvement in fuel economy with increased uniformity of operation results from regulation of the proportion of the gases produced in the hot zone which is allowed to pass up through the shaft and out of the furnace through the usual top gas outlet; such regulation being effected by withdrawing a controlled amount of gas through outlet provided for this purpose in the hot zone of the furnace. In so withdrawing gas through horizontally disposed or inclined conduits inserted through the furnace walls and leading into settling, cooling or filtering chambers, these chambers delivering gas through valve-controlled conduits, there is a tendency for the solid furnace materials to be carried out of the furnace in the gas current and to collect in undue amount in the chambers and conduits. Furthermore, regulation of the amount of hot gas withdrawn from the furnace is attended with some disadvantage when between the furnace and the valve controlling the outlet of gas from the hot zone there is a system of chambers in which the gas is treated in various ways.

An object of the present invention is to provide gas outlet from the hot zone of the furnace which reduces to a minimum the tendency for solid materials to be carried out of the furnace with the gases. Another object is to effect direct and positive control of the amount and velocity of flow of the hot gas withdrawn and to facilitate the removal of volatile salines from the furnace.

In the accompanying drawing is shown more or less diagrammatically one embodiment of the invention. The figure shows a view in vertical section.

In this showing 1 represents the structure of a hot gas outlet which is attached to or built in the wall of a blast furnace, the structure being supported by column 2, and, when built into the furnace wall, being above the bosh 3. In this structure is a vertically disposed, refractory lined, substantially long flue 4 leading from opening 5 in the interior of the furnace wall, such opening serving as inlet to said flue. Near the top of flue 4 a horizontal outlet passage 6 leads into refractory lined conduit 7 which is supported from the furnace casing or shell. If desired, conduit 7 may be water cooled. As shown, conduit 7 is T-shaped having a depending arm 8 connected with conduit 9 which leads to cooling, settling or filtering chambers (not shown). Conduit 7, as shown, is larger in internal diameter or cross section than flue outlet 6 which thus forms a seat with which water cooled metal valve 10 engages, this closing the outlet when desired. Valve 10 also operates to constrict outlet 6 and to limit and control the velocity of gas flow through flue 4 and also that through opening 5. The lining of conduit 7 may be tapered with increasing internal diameter toward its outer end and valve 10 may be correspondingly tapered. Valve-stem 11 comprises two concentric tubes serving as water inlet and outlet. From opening 5 which may be larger or smaller in section than flue 4, opening 12 leads to cooler 13 provided with stuffing box 14 through which bar 15 may be operated to remove obstructions to the passage of gas through 5 and 4. Any desired number of flues may be provided at intervals circumferentially of the furnace, and conduit 9 may encircle the furnace in a manner similar to that of the air bustle; each flue outlet delivering gas through valve controlled means 7, via 8, to conduit 9, which may itself be provided with a water-cooled valve or damper 16. An opening 17, leading from the top of flue 4 into the interior of the furnace, serves to maintain an upward flow of gas with condensation of saline vapors in 4; condensate being removed through 12. The condensation and removal of salines limits their accumulation in the furnace, with consequent benefit to fuel economy when making iron. Deposited salines in the flues may at intervals be blown out of the furnace through increasing the flow of hot gas through individual outlets by opening valve 10.

It is apparent that the combination of apparatus elements above described conduces to ready control of the amount of hot gas withdrawn from the furnace, and to a minimum of solid furnace materials carried in suspension. A great advantage of the invention is that it makes possible a quick, direct and positive regulation of the volume of gas ascending through the furnace shaft, enabling a close coordination of such volume with the mass of the descending materials. Design of the size and number of the outlets is such as to give control of the velocity of the gas flow in each, while maintaining a positive pressure in the furnace. The gas flow through the flues prevents an undue accumulation in the furnace of volatile salines, such as alkalis, cyanids etc.

What I claim is:—

1. The combination with a blast furnace of a vertical flue adjacent thereto, means connecting said flue with the hot zone of the furnace and outlet means near the top of said flue for withdrawing an adjusted quantity of gases therefrom, the said outlet means provided with a controlling valve.

2. The combination with a blast furnace of a vertical flue adjacent thereto, means connecting said flue with the hot zone of the furnace and outlet means near the top of said flue for withdrawing an adjusted quantity of gases therefrom, the said outlet means comprising a passage connected with a conduit of cross section larger than that of the said passage, said conduit provided with a controlling valve adapted to engage with the said passage.

3. The combination with a blast furnace of a vertical flue adjacent thereto, inlet means connecting said flue with the hot zone of the furnace, and constricted outlet means conecting said flue with a hot gas conduit, said constricted connecting means comprising means for limiting the velocity of gas flow through said flue from the furnace.

4. The combination with a blast furnace of a vertical flue adjacent thereto, means connected with the interior of the furnace at the hot zone and with the said flue for delivering hot gases to the flue, means for cleaning out the last said means, and means at a higher point in said vertical flue for controllably removing gases therefrom.

5. In outlet means for gas from the hot zone of a blast furnace, a vertically disposed flue in the furnace wall, said flue connected near its lower end to the hot zone of the furnace and near its upper end to a valve-controlled conduit adapted to carry hot gases from the furnace.

6. In a blast furnace, means for withdrawing gas from the hot zone which comprises a plurality of vertically disposed flues circumferentially spaced around the furnace wall, each of said flues being connected near its lower end with the interior of the furnace and delivering through a valve-controlled conduit into a conduit common to said flues.

7. In a blast furnace, means for controlling fuel economy which comprises a substantially long vertically disposed flue in the furnace wall, said flue connected at bottom and top with the interior of the furnace, in combination with means for removing condensed salines from said flue.

In testimony whereof, I have hereunto affixed my signature.

RICHARD FRANCHOT.